(12) United States Patent
Fell et al.

(10) Patent No.: US 6,674,994 B1
(45) Date of Patent: Jan. 6, 2004

(54) PICKUP AND DELIVERY OF DATA FILES

(75) Inventors: Gail Hegarty Fell, Rye, NY (US); Jie Yang, Stamford, CT (US); Walter Randall Tabor, Lithonia, GA (US); David Lynn Bullock, Conyers, GA (US); John Joseph McClure, Stone Mountain, GA (US)

(73) Assignee: Panamsat Corporation, Wilton, CT (US)

( * ) Notice: Subject to any disclaimer, the term of this patent is extended or adjusted under 35 U.S.C. 154(b) by 0 days.

(21) Appl. No.: 09/452,500

(22) Filed: Dec. 1, 1999

(51) Int. Cl.[7] .................................................. H04H 7/00
(52) U.S. Cl. ..................... 455/3.06; 455/12.1; 455/427; 725/63
(58) Field of Search ............................. 725/63, 67, 68, 725/91, 93, 100, 114, 134; 155/427, 3.06, 12.1; 370/318, 322

(56) References Cited

U.S. PATENT DOCUMENTS

| | | |
|---|---|---|
| 4,334,306 A | 6/1982 | Ulug |
| 4,695,880 A | 9/1987 | Johnson et al. |
| 4,793,813 A | 12/1988 | Bitzer et al. |
| 4,807,224 A | 2/1989 | Naron et al. |
| 4,841,526 A | 6/1989 | Wilson et al. |
| 5,253,275 A * | 10/1993 | Yurt et al. .................. 375/122 |
| 5,392,353 A | 2/1995 | Morales |
| 5,426,642 A | 6/1995 | Tanabe |
| 5,459,725 A | 10/1995 | Bodner et al. |
| 5,473,642 A | 12/1995 | Osawa et al. |
| 5,481,542 A | 1/1996 | Longston et al. |
| 5,553,083 A | 9/1996 | Miller |
| 5,557,320 A | 9/1996 | Krebs |
| 5,572,678 A | 11/1996 | Homma et al. |
| 5,583,561 A | 12/1996 | Baker et al. |
| 5,594,490 A | 1/1997 | Dawson et al. |
| 5,610,920 A | 3/1997 | Doll et al. |
| 5,617,565 A | 4/1997 | Augenbraun et al. |

(List continued on next page.)

FOREIGN PATENT DOCUMENTS

| | | |
|---|---|---|
| EP | 483547 | 5/1992 |
| WO | 91/13503 | 9/1991 |
| WO | 95 34153 A | 12/1995 |
| WO | 98/18076 | 4/1998 |
| WO | 99/48009 | 9/1999 |

OTHER PUBLICATIONS

International Search Report from the PCT (Dated Dec. 28, 2000).

Spracklen: "Digital Communications Protocols in the Satellite Environment" IEE Colloquium on Integration of Satellite And Terrestrial PCS, GB, IEE, London, Apr. 7, 1997. (pp. 1–7).

(List continued on next page.)

Primary Examiner—William Trost
Assistant Examiner—James Ewart
(74) Attorney, Agent, or Firm—David A. Loewenstein

(57) ABSTRACT

A data file is regarded as a digital package. A conventional interface is provided for scheduling pickup and delivery of the data file via one or more satellite communications links. The data file may represent various types of information, such as text, images, audio or video. A centralized system receives the scheduling order and arranges for the data file to be automatically picked up from one or more locations and delivered to one or more destinations. The delivery service may include buffering the data file for a predetermined time period to comply with the scheduled delivery time. The centralized system provides a scheduling confirmation notice for the scheduled pickup and delivery, and also provides notice that the data file was actually delivered. The centralized system maintains an activity log useful for status inquiry and billing. In short, the centralized system functions as a "dispatcher" for bits, within an infrastructure for receiving, tracking, delivery and billing based on bits.

8 Claims, 4 Drawing Sheets

U.S. PATENT DOCUMENTS

| | | | |
|---|---|---|---|
| 5,657,072 A | | 8/1997 | Aristides et al. |
| 5,689,081 A | * | 11/1997 | Tsurumi .................... 84/609 |
| 5,694,334 A | | 12/1997 | Donahue et al. |
| 5,701,451 A | | 12/1997 | Rogers et al. |
| 5,710,918 A | | 1/1998 | Lagarde et al. |
| 5,724,345 A | | 3/1998 | Guarneri et al. |
| 5,727,002 A | | 3/1998 | Miller et al. |
| 5,727,129 A | | 3/1998 | Barrett et al. |
| 5,740,164 A | | 4/1998 | Liron |
| 5,748,736 A | | 5/1998 | Mittra |
| 5,761,417 A | | 6/1998 | Henley et al. |
| 5,774,664 A | | 6/1998 | Hidary et al. |
| 5,790,541 A | | 8/1998 | Patrick et al. |
| 5,793,973 A | | 8/1998 | Birdwell et al. |
| 5,799,150 A | | 8/1998 | Hamilton et al. |
| 5,835,087 A | | 11/1998 | Herz et al. |
| 5,845,206 A | | 12/1998 | Castiel et al. |
| 5,884,142 A | | 3/1999 | Wiedeman et al. |
| 5,893,091 A | | 4/1999 | Hunt et al. |
| 5,905,940 A | | 5/1999 | Arvisais |
| 5,909,439 A | | 6/1999 | Kuwabara et al. |
| 5,913,210 A | | 6/1999 | Call |
| 5,915,094 A | | 6/1999 | Kouloheris et al. |
| 5,920,701 A | * | 7/1999 | Miller et al. ................ 709/228 |
| 5,929,850 A | | 7/1999 | Broadwin et al. |
| 5,930,473 A | | 7/1999 | Teng et al. |
| 5,931,908 A | | 8/1999 | Gerba et al. |
| 5,940,295 A | | 8/1999 | Rous |
| 5,940,391 A | | 8/1999 | Malkin et al. |
| 5,940,739 A | | 8/1999 | Conrad et al. |
| 5,953,350 A | | 9/1999 | Higgins |
| 5,956,716 A | | 9/1999 | Kenner et al. |
| 5,957,409 A | | 9/1999 | Castiel et al. |
| 5,961,603 A | | 10/1999 | Kunkel et al. |
| 5,963,551 A | | 10/1999 | Minko |
| 5,963,557 A | | 10/1999 | Eng |
| 5,970,143 A | | 10/1999 | Schneier et al. |
| 5,973,722 A | | 10/1999 | Wakai et al. |
| 5,974,133 A | | 10/1999 | Fleischer, III et al. |
| 5,977,963 A | | 11/1999 | Gaughan et al. |
| 5,978,363 A | | 11/1999 | Dimitrijevic et al. |
| 5,978,381 A | | 11/1999 | Perlman et al. |
| 5,978,650 A | | 11/1999 | Fischer et al. |
| 5,983,005 A | | 11/1999 | Monteiro et al. |
| 5,987,233 A | | 11/1999 | Humphrey |
| 5,987,518 A | | 11/1999 | Gotwald |
| 5,991,306 A | | 11/1999 | Burns et al. |
| 5,995,708 A | | 11/1999 | Corey |
| 5,999,970 A | | 12/1999 | Krisbergh et al. |
| 6,002,720 A | | 12/1999 | Yurt et al. |
| 6,002,852 A | | 12/1999 | Birdwell et al. |
| 6,003,030 A | | 12/1999 | Kenner et al. |
| 6,005,561 A | | 12/1999 | Hawkins et al. |
| 6,005,602 A | | 12/1999 | Matthews, III |
| 6,006,069 A | | 12/1999 | Langston |
| 6,009,099 A | | 12/1999 | Lewis et al. |
| 6,016,319 A | | 1/2000 | Kshirsagar et al. |
| 6,016,388 A | | 1/2000 | Dillon |
| 6,016,520 A | | 1/2000 | Facq et al. |
| 6,018,359 A | | 1/2000 | Kermode et al. |
| 6,018,522 A | | 1/2000 | Schultz |
| 6,018,530 A | | 1/2000 | Chakravorty |
| 6,020,883 A | * | 2/2000 | Herz et al. |
| 6,021,307 A | * | 2/2000 | Chan |
| 6,023,731 A | * | 2/2000 | Chawla |
| 6,025,837 A | * | 2/2000 | Matthews, III et al. |
| 6,219,669 B1 | * | 4/2001 | Haff et al. .................... 707/10 |
| 6,230,205 B1 | * | 5/2001 | Garrity et al. ............... 709/231 |
| 6,317,593 B1 | * | 11/2001 | Vossler .................... 455/414.1 |
| 6,351,467 B1 | * | 2/2002 | Dillon ........................ 370/432 |
| 6,389,471 B1 | * | 5/2002 | Agraharam et al. ......... 709/227 |
| 6,438,217 B1 | * | 8/2002 | Huna ...................... 379/88.14 |
| 6,463,354 B1 | * | 10/2002 | Pintsov ..................... 700/227 |

OTHER PUBLICATIONS

"High speed file transfer, point to point and multipoint, using satellite links" by Valet Isabelle *Data Networks with Satellites Working Conference of the Joint GI/NTG Working Group*, pp. 178–186, Springer–Verlag, 1983.

Storage and Retrieval of Image and Video Databases II, IS&T/SPIE Symp. on Elec. Imaging Sci. & Tech., San Jose, CA, Feb. 1994. (pp. 185–197) "A distributed Hierachical Storage Manager for a Video–on–Demand System".

A.G. Waters and J.S.J. Daka, IEEE Conf. On Telecommunications, pp. 133–138, 1989.

Eva Henriksen, Gisle Aas and Jan B. Rydningen, $11^{th}$ Annual International Phoenix Conf. On Computers and Communications, pp. 590–596, 1992.

Henry V. Todd and James S. Meditch, IEEE INFOCOM '96, pp. 1072–1079, 1996.

Technical Report of NTIS (ADA323060) by Stanley B. Zdonik, "The design and implementation of a high–pefomance storage server."

Thesis for Master's degree of Univ. of Maryland by Aaron David Falk (1994), "A system design for a hybrid network data communications terminal using asymmetric TCP/IP to support internet applications."

VSATs Edited by John Everett—Peter Peregrinus Ltd. pp. 464–465 (1992).

Communication Satellite Systems, Edited by James Martin, pp. 251–252, 1978.

Internetworking With TCP/IP vol. 1: Principles, Protocols, and Architecture, by Douglas E. Comer, 2nd edition, p. 377–390, Prentice Hall (1991).

Hill, Christian G., "IBeams's Desnoes Is Betting on Use of Satellites To Transmit Audio and Video Over the Internet", Wall Street Journal, Technology Journal.

"Teleglobe Achieves Success With Internet Delivery System Trial", Business Wire, Inc. 1999, pp. 1–3.

Internet pages on "The Intervu Network", from www.intervu.net.

Internet pages on "why iBeam?", from www.ibeam–net.com.

* cited by examiner

REGISTRATION

ACCOUNT NAME  
PASSWORD  
E-MAIL

BILLING NAME  
ADDRESS  
PAYMENT MEANS

DEFAULT SHIPPING  
    PICKUP INSTRUCTIONS  
      PLACE  
      FORMAT, SIZE  
      TIME  
    PRIORITY  
    FREQUENCY

SUBMIT — 151

SCHEDULING ORDER

ACCOUNT NAME  _____
PASSWORD      _____

PAYMENT       _____
(if other than default)

SERVICE TYPE  _____

DATA FILE TO      PLACE    _____
BE PICKED UP      FORMAT   _____  SIZE _____
                  TIME     _____
                  PRIORITY _____
                  FREQUENCY _____

DESTINATION       PLACE or RECIPIENT LIST   _____
                  DELIVERY TIME             _____
                  ACKNOWLEDGMENT TYPE       _____

| SUBMIT |——171

PICKUP AND DELIVERY OF DATA FILES

BACKGROUND OF THE INVENTION

The present invention relates to a method and system for data file pickup and delivery, and, more particularly, is directed to a centralized system including a satellite link for delivering data files in accordance with instructions by a user through a screen-based interface.

As the popularity of the Internet increases, there is a commensurate increase in the need to deliver content over large distances, bypassing clogged communication channels. Sometimes content must be delivered according to a specified schedule that may be one-time or recurring. This need is particularly critical for files which must be delivered in a real time or near real time sequence, such as audio and video files, and for files which must be delivered at the same time to a multiplicity of places. A similar situation exists for data streamed during delivery.

There is also a need for an automated interface by which a user can schedule and manage transfer of data files, so that file transfer services can be provided in a highly cost-effective manner.

SUMMARY OF THE INVENTION

In accordance with an aspect of this invention, there are provided a method of and a system for transmitting a file using a satellite communications link in accordance with a scheduling order specifying pickup and delivery instructions for the file.

According to a further aspect of the invention, the scheduling order is received from a user, the scheduling order also specifying at least one location and time for retrieval of the file.

In accordance with another aspect of this invention, there is provided a user interface for scheduling a file transfer, comprising a terminal for displaying a data screen to the a user, the data screen including fields for specifying a file location, size, pickup time and delivery time, and means for sending information entered through the data screen to a central system.

In accordance with another aspect of this invention, there are provided a method and a system for receiving a file that has been transmitted using a satellite communications link in accordance with a scheduling order specifying pickup and delivery instructions for the file.

According to a further aspect of the invention, this file is transmitted by multicasting, and delivery availability according to the scheduling order is confirmed before the file is received.

It is not intended that the invention be summarized here in its entirety. Rather, further features, aspects and advantages of the invention are set forth in or are apparent from the following description and drawings.

BRIEF DESCRIPTION OF THE DRAWINGS

FIG. 3 is a chart showing a screen for customer registration; and

FIG. 4 is a chart showing a screen for scheduling data file pickup and delivery.

DETAILED DESCRIPTION OF THE PREFERRED EMBODIMENTS

The present technique regards a data file as a digital package, and provides a convenient interface for scheduling pickup and delivery of the data file via one or more satellite communication links. The data file may represent various types of information, such as text, images, audio or video. A centralized system receives the scheduling order and arranges for the data file to be automatically picked up from one or more locations and delivered to one or more destinations. The delivery service may include buffering the data file for a predetermined time period to comply with the scheduled delivery time. The centralized system provides a scheduling confirmation notice for the scheduled pickup and delivery, and also provides notice that the data file was actually delivered. The centralized system maintains an activity log useful for status inquiry and billing. In short, the centralized system functions as a "dispatcher" for bits, within an infrastructure for receiving, tracking, delivering and billing based on bits.

The centralized system provides comprehensive management of communication channel capacity, particularly in the space segment. Multiple satellites may provide capacity on an ongoing basis, with capacity available on additional satellites during peak demand. The centralized system also efficiently manages capacity on inter-satellite links, if any.

The present technique also provides a user with an easy to use screen-based interface for scheduling data file pickup and delivery without the burden of managing communications. capacity. The user interface also allows the user to track the progress of the data file from its source(s) to its destination(s).

Figure 1:
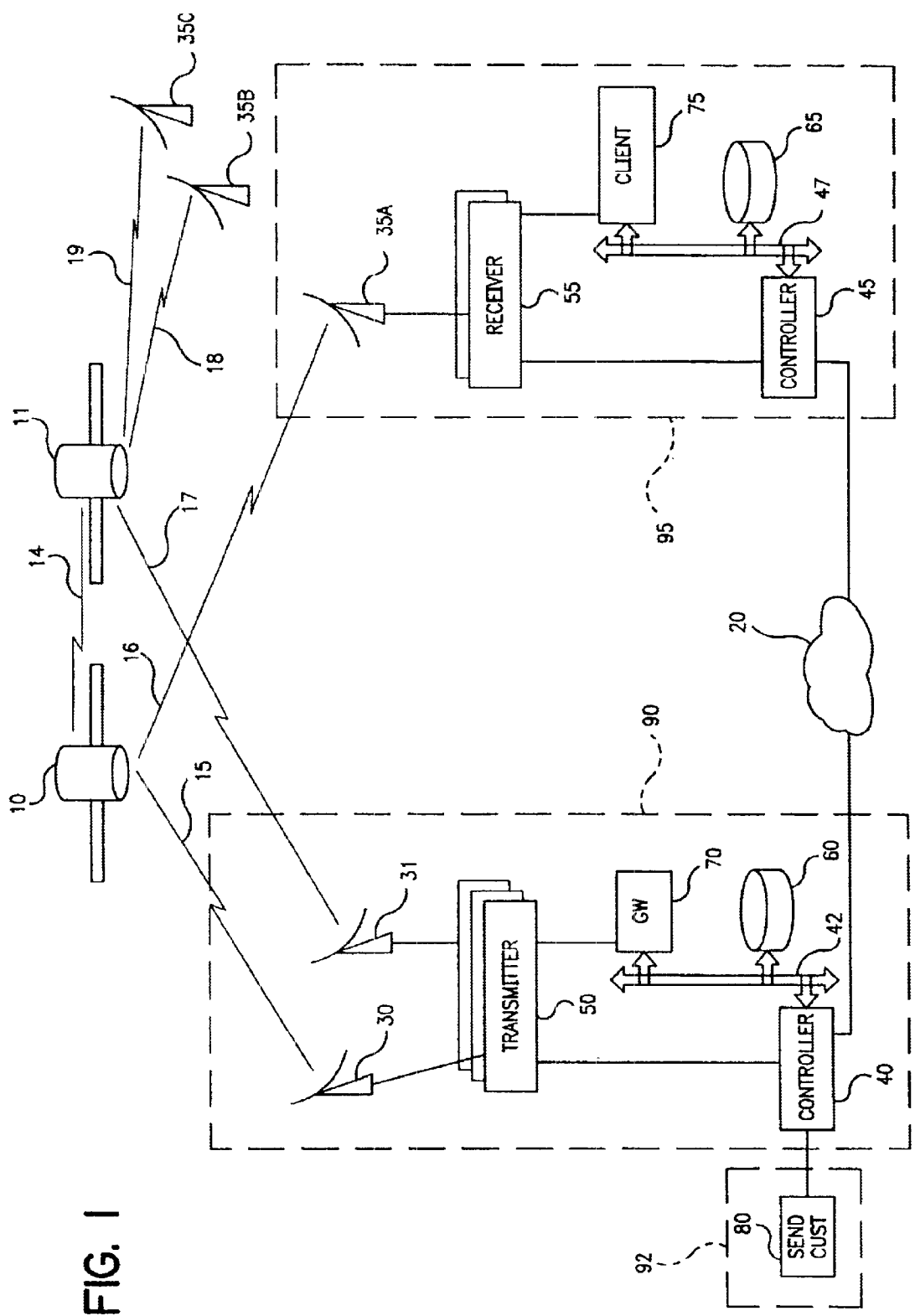
FIG. 1 is a block diagram illustrating an environment in which the present invention is applied.

Referring now to the drawings, and in particular to FIG. 1, there is illustrated an environment in which the present invention is applied. FIG. 1 shows communication satellites 10, 11, inter-satellite link 14, satellite links 15, 16, 17, 18, 19, terrestrial network 20, earth stations 30, 31, 35A, 35B, 35C, controllers 40, 45, data buses 42, 47, transmitter 50, receiver 55, data storage units 60, 65, gateway 70, client 75, sending customer terminal 80, service provider premises 90 and customer premises 92, 95.

Generally, terrestrial links are assumed to operate in a duplex handshaking manner. Satellite links typically operate in simplex mode although a return link is sometimes configured via a terrestrial or other satellite link.

Communications satellites 10 and 11 are preferably in geostationary orbit. Other orbits may be used, and those of ordinary skill in the art will understand the additional communications overhead needed to communicate with satellites in other than geostationary orbit. Satellite 10 is adapted to receive information on uplink 15 from earth station 30 and to transmit the received information on downlink 16 covering earth station 35A. This is referred to as a forward channel. In some embodiments, satellite 10 is also adapted to receive information from earth station 35A on a second uplink and to transmit the received information on a second downlink to earth station 30. This is referred to as a reverse channel. It will be appreciated that the actual communication channel may be the same for the first and second uplinks and downlinks, respectively, and can be re-used.

Satellite 11 is adapted to receive information on uplink 17 from earth station 31 and to transmit the received information on a downlink covering earth stations 35B, 35C. For clarity, the downlink from satellite 11 is depicted as downlinks 18, 19, although it will be understood that the information on each of these downlinks is identical. In some embodiments, satellite 11 is also adapted to transmit from earth stations 35B, 35C to earth station 31.

In the embodiment shown in FIG. 1, satellites 10 and 11 communicate directly with each other via inter-satellite link 14. For example, to transmit from earth station 30 to earth station 35C, the best path may be via uplink 15, inter-satellite link 14 and downlink 19.

Earth stations 30, 31 and 35A–35C each include an antenna for communicating with one of satellites 10 and 11 and appropriate electronics for converting between a baseband electrical signal and a radio frequency signal, such as in Ka, Ku or C band.

Terrestrial network 20 encompasses the public switched telephone network (PSTN) including wireline and wireless links, the Internet and any private wireline and wireless terrestrial communication channels established for communication between controllers 40 and 45.

For brevity, only the configurations coupled to earth stations 30 and 35A will be discussed. In practice, many earth stations communicate with many satellites in the manner discussed below.

The transmitting configuration for an earth station will now be discussed. Earth station 30 is an example of a transmitting earth station.

Sending customer terminal 80 is a general purpose processor, such as a personal computer, personal digital assistant or the like. Customer terminal 80 is coupled to controller 40 via an appropriate communication channel, such as a dedicated communication line, a local area network, a dial-up communication line, an Internet packet switched channel and so on. Sending customer terminal 80 is adapted to provide a screen-based interface for entering scheduling orders for data file pickup and delivery, to receive notices from the central system relating to the scheduled pickup and delivery services, and to provide a data file for pickup. The data file may represent various types of information, such as text, images, audio or video. The data files may be delivered via Internet file transfer protocol (FTP), transmission control protocol (TCP), user datagram protocol (UDP) and so on.

In one embodiment, the screen-based interface is provided via access to an Internet web site. In another embodiment, additional software for practicing the present technique is operative in customer terminal 80 for providing the screen-based interface. In some embodiments, the web site or additional software is activated by clicking on an icon on a virtual desktop.

Gateway 70 is a general purpose processor is coupled to controller 40 and data storage unit 60 via data bus 42. In some embodiments, gateway 70 is controlled by the sending customer although it is physically at the service provider's premises. Gateway 70 functions to receive a data file from data storage unit 60 in response to an instruction from controller 40, to convert the format of the received data file to a different format in response to another instruction from controller 40, and to provide the retrieved data file, as selectively converted, to transmitter 50.

In one embodiment, gateway 70 acts as a digital video broadcast (DVB)/internet protocol (IP) gateway, handling the conversion from IP packets to DVB/MPEG II packets. Standards defining these conversions include "DVB Specification for Data Broadcasting" (EN 301 192), "Digital Video Broadcasting: Specification for Service Information in DVB systems" (EN 300 468), "DVB Guidelines on Implementation and Usage of Service Information" (ETR 211), "Extension for Digital Storage Media Command and Control (DSM-CC)-International Standard (IS)" (ISO/IEC 13818-6), and so on. All of these standards are available at www.dvb.org.

Compliance with the DVB data broadcast standard requires an ability to perform Multiprotocol Encapsulation (MPE). MPE defines how communication protocols in the form of datagrams are encapsulated in DSM-CC sections that comply with, for example, the MPEG-II Transport Stream packet format (ISO/IEC 13818-1). Compliance with EN 300 468 requires insertion of service information data for self configuration as specified by ETS 300 468 so that program information allowing receivers to automatically tune themselves to the correct parameters can be placed into MPEG transponder streams.

Although use of DVB is described herein, it will be understood that other protocols may be used such as asynchronous transfer mode (ATM).

Gateway 70 is adapted to output multiple program IDs simultaneously, so that the central system can put multiple services into a single uplink stream and segment bandwidth for each customer and service. Gateway 70 supports IP unicasting, IP multicasting and broadcasting. It also supports IP static and dynamic routing.

Data storage unit 60 is a magnetic, optical, transistor, magneto-optical or other high capacity storage medium, and is coupled to gateway 70 and controller 40 via data bus 42. Data storage unit 60 functions to store data files supplied thereto from controller 40 and to provide the stored files to gateway 70 in accordance with control commands from controller 40.

Transmitter 50 is a communication device such as a modem, and is coupled to earth station 30, controller 40 and gateway 70. Transmitter 50 is adapted to receive files from gateway 70 and to provide these files to earth station 30 for transmission on uplink 15 to satellite 10, in accordance with instructions from controller 40. In practice, many transmitters may be used for each satellite, depending on the frequencies of the uplinks and downlinks on the satellite. The specific transmitter details are known to those of ordinary skill in the art and are omitted here for brevity.

Controller 40 is a general purpose computer programmed according to the present technique, and is coupled to sending customer terminal 80, gateway 70, data storage unit 60, transmitter 50 and terrestrial network 20 via appropriate communication channels. Controller 40 is adapted to receive scheduling orders for data file pickup and delivery from customer terminal 80 and to send status notices to customer terminal 80. Controller 40 is further adapted to retrieve a data file from customer terminal 80 and transfer it to data storage unit 60; to instruct data storage unit 60 to receive and provide information; and to instruct data storage unit to 60 supply a data file to gateway 70. Controller 40 is additionally adapted to communicate with controller 45 to schedule data file delivery and receive notices from controller 45 relating to delivered data files. When retrieving a data file from customer terminal 80, controller 40 serves as a firewall.

The receiving configuration for an earth station will now be discussed. Earth station 35A is an example of a receiving earth station.

Receiver 55 functions as a standalone DVB/IP receiver, including a channel interface, a demodulator, a forward error detection/correction unit and a DVB demultiplexer. The multiplexed DVB signal may contain multiple program IDs, for carrying unicast, multicast and broadcast traffic. Receiver 55 performs program ID filtering, and router-type filtering, that is, receiver 55 only forwards multicast IP subnetwork traffic for destinations coupled thereto and discards the remainder, in accordance with Internet Group Management Protocol (IGMP). In other embodiments, receiver 55 operates according to a format other than DVB.

Data storage unit 65 functions in a similar manner as data storage unit 60, and will not be described further for brevity.

Client 75 is a general purpose computer coupled to receiver 55, data storage unit 65 and controller 45. Client 75 is the destination for a data file transmitted from customer terminal 80. Client 75 is adapted to receive data files from data storage unit 65. In some embodiments, client 75 receives data files directly from receiver 55.

FIG. 1 shows client 75 and earth station 35A co-located at customer premises 95. In another embodiment, earth station 35A is located at service provider destination premises while the functionality of client 75 is split between the service provider destination premises and the customer destination premises.

Controller 45 is coupled to client 75, data storage unit 65, receiver 55 and terrestrial network 20 via appropriate communication channels. Controller 45 is adapted to receive scheduling requests for data file delivery from controller 40 via terrestrial network 20, to respond thereto based on facilities availability, to notify receiving customer terminal of a scheduled delivery, to receive confirmation from client 75 that a data file has been delivered thereto, and to send notices to controller 40 confirming data file delivery. Controller 45 is further adapted to instruct receiver 55 to receive a data file from earth station 35A that has been transmitted on downlink 16 from satellite 10 and convert the format of the data file, to instruct data storage unit 65 to receive and provide information, and to instruct client 75 to receive a data file from data storage unit 65.

Figure 2:
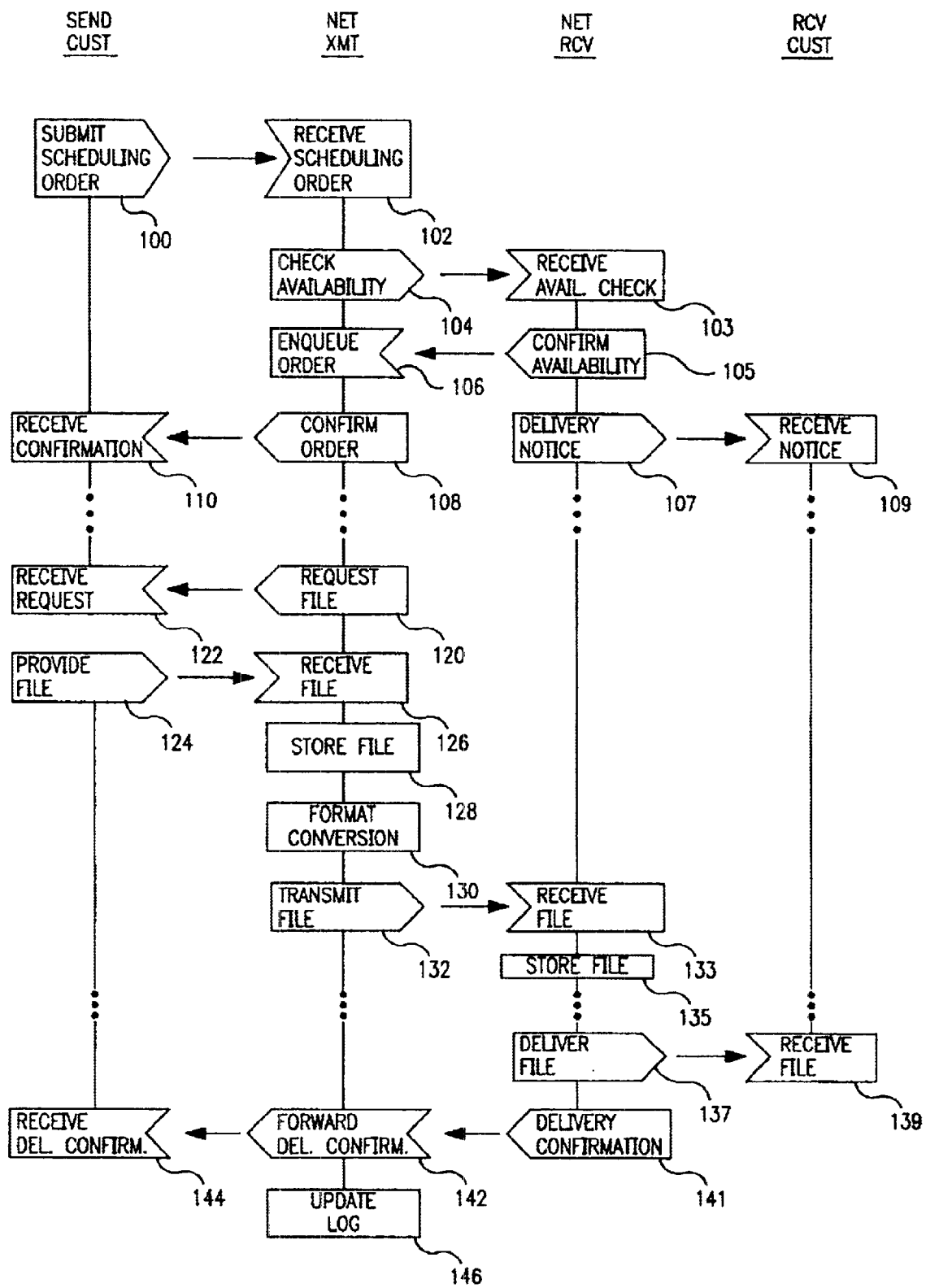
FIG. 2 is a flowchart illustrating data file pickup and delivery according to the present invention.

FIG. 2 is a flowchart illustrating data file pickup and delivery. FIG. 2 shows activity occurring at four places: "SEND CUST"—meaning sending customer terminal 80, "NET XMT"—also referred to as the system transmitter—meaning earth station 30, controller 40, data storage unit 60 and gateway 70, "NET RCV"—also referred to as the system receiver—meaning earth station 35A, controller 45, receiver 55 and data storage unit 65, and "RCV CUST"—meaning client 75. In FIG. 2, horizontal arrows indicate transmission of information between locations, and the vertical direction indicates time.

It is assumed that a user has already registered with the central system. FIG. 3, discussed below, is an example of a screen-based interface used for registration.

The process of file pick up and delivery is discussed in detail below. As an overview, at the scheduled pickup time, the data file is sent from customer terminal 80 to controller 40. If necessary, other portions of the data file are sent from other customer locations to controller 40. Controller 40 stores the data file in data storage unit 60. When it is time for the data file to be transmitted, controller 40 retrieves the data file from data storage unit 60 and transfers the data file to gateway 70 that converts the file format, for example, to DVB/MPEG II format, and delivers the converted data file to transmitter 50.

At the receiving side, receiver 55 receives the data file via downlink 16, converts its format in accordance with the scheduled delivery instructions as applied by controller 45, and delivers the converted data file to client 75. Appropriate acknowledgement and reporting to controller 40 occurs through the path of the data file so that its progress can be readily monitored.

At step 100, a user at sending customer terminal 80 submits a scheduling order for file pickup and delivery. FIG. 4, discussed below, is an example of a screen-based interface for creation of a scheduling order.

At step 102, controller 40 of the system transmitter receives the scheduling order. At step 104, controller 40 checks whether facilities are available to transmit the data file by contacting the appropriate ones of gateway 70 and controller 45. Together, controllers 40 and 45 schedule transmission capacity and storage capacity at the transmitting and receiving sides of satellite 10. Generally, storage and conversion of a data file, as needed, occurs as the transmitting side. In some situations, depending on facilities availability, it may be preferable to store and/or convert the data file at the receiving side.

At step 103, controller 45 receives the availability check and determines whether it can comply with the requested data file transfer. Generally, the determination is positive, and at step 105, controller 45 confirms availability, and at step 107 prepares and sends a delivery notice to client 75 providing notice of a future data file delivery. If the determination is negative, then controller 45 replies with what it can accomplish, and controller 40 may send a new availability check. In some embodiments, a delivery notice is not sent to receiving client 75.

At step 106, controller 40 receives a positive availability reply from controller 45, enqueues the file pickup and delivery order, and, at step 108, prepares and sends an order confirmation notice to customer terminal 80. At step 110, customer terminal 80 receives the confirmation notice.

In some embodiments, customer terminal 80 is coupled to controller 40 via an Internet connection, and the confirmation notice is received while the user is still at the web site in communication with controller 40. In one case, controller 40 is also operative as a web server. In another case, controller 40 is contacted by one or more web servers and provides hypertext transfer protocol (HTTP) responses to the web server. In a farther case, the confirmation notice is sent as an electronic mail (e-mail) message to an e-mail account specified during registration.

In other embodiments, customer terminal 80 is coupled to controller 40 via a circuit switched connection, and the confirmation notice is received while the user is still at controller 40, or is sent to an e-mail account specified during registration.

When it is time for the file to be picked up, at step 120, controller 40 obtains the data file from customer terminal 80 via an appropriate communication channel such as the Internet. At step 122, customer terminal 80 receives the file pickup request, and at step 124, provides the requested file. At step 126, controller 40 receives the retrieved data file and stores the retrieved file in data storage unit 60.

In some embodiments, instead of picking up the file electronically, the user, also referred to as the customer, may send the file to controller 40 on a disk or other portable media in advance of the scheduled pickup time. In some cases, the data file to be picked up is at a customer location (not shown) other than customer terminal 80, such as at a transmitting video camera. In cases where portions of the data file are obtained from different locations, a different pick up method may be used at each location.

In some embodiments, the customer can schedule a file pickup, and then schedule delivery of the file at a later time such as after the file has been picked up.

At step 130, controller 40 instructs gateway 70 to convert the format of the stored data file, as needed, such as by separating it into datagram sized packets, separating it into multicast formatted packets or converting a file into a DVB/MPEG format file. Format conversion may be required to comply with the pickup and delivery instructions. Format conversion may be required by internal service provider transmission format requirements. Other format conversions will be apparent to those of ordinary skill.

At step 132, controller 40 instructs transmitter 50 to transmit the data file, as converted, on uplink 15 to satellite 10. The transmission time is selected in view of facility availability, as scheduled at steps 103–106, and can be substantially before the scheduled data file delivery time. That is, file buffering can be performed in the transmit side or the receive side due to the presence of data storage units 60 and 65. When data storage unit 65 is used as a temporal file buffer, it is akin to a cache.

At step 133, receiver 55 receives the transmitted data file. In response to instructions from controller 45, at step 135, receiver 55 converts the format of the data file and stores the data file in data storage unit 65.

When it is time for the file to be delivered, at step 137, server 45 instructs data storage unit 65 to provide the data file to client 75. At the completion of the file delivery, client 75 provides a delivery confirmation notice to controller 45.

At step 141, controller 45 provides a delivery confirmation notice to controller 40. In one embodiment, the delivery confirmation notice is sent via terrestrial network 20. In another embodiment, the delivery confirmation notice is sent via a second uplink (not shown) from earth station 35A to satellite 10 and then on a second downlink (not shown) to earth station 30.

At step 142, controller 40 forwards the delivery confirmation notice to customer terminal 80, such as by e-mail or facsimile transmission. At step 144, customer terminal 80 receives the delivery confirmation notice. At step 146, controller 40 records the successful file delivery in a log for management and accounting purposes.

In some embodiments, controller 40 also logs the progress of the file through the central system at other points so that a user can check the location and status of the file using, for example, a screen-based interface (not shown).

In some embodiments, client 75 employs a screen-based interface, provided in a similar manner as the screen-based interface of sending customer terminal 80, that enables client 75 to request inclusion in a multicast group from controller 40 via controller 45 and terrestrial network 20 or other suitable communications channel.

FIG. 3 is a chart showing registration screen 150 for customer registration. This screen is provided to terminal 80, for example, when terminal 80 is in communication with an Internet web site, or has otherwise established a connection with controller 40. In some embodiments, a separate registration processor is used instead of controller 40.

Registration screen 150 contains fields for entry of the customer's account name, password, e-mail address, billing information and default file pickup and delivery instructions. Billing information includes a physical address and payment means, such as a credit card or authorized credit account. The chart in FIG. 3 is merely an illustrative example of registration screen 150; other designs and fields will be apparent to those of ordinary skill in the art.

Some customers may wish to schedule a regular file pickup and delivery, for example, a daily corporate news broadcast. Registration screen 150 allows the customer to specify the file pickup place or places, such as a directory on customer terminal 80, the format and size of the file to be picked up, the time of pick up, the frequency of pick up and the priority of the pick up. For example, a news video file has real-time priority, while low priority may be appropriate for a financial log or historical video file. The frequency may be daily, once a week, once a hour and so on.

Customers who do not wish to have a regular file pickup and delivery simply omit default shipping instructions.

FIG. 4 is a chart showing scheduling order screen 170 for scheduling data file pickup and delivery, either on a recurring basis or as a one-time event. Scheduling order screen 170 includes data entry fields for the customer's account name and password, for specification of payment information if other than the default payment method specified at registration is to be used, for identifying the characteristics of the data file to be picked up, and its pickup time and frequency, and for identifying the destination(s) of the data file. The chart in FIG. 4 is merely an illustrative example of scheduling order screen 170; other designs and fields will be apparent to those of ordinary skill in the art.

As mentioned above, in some embodiments, within a short time after clicking on submit button 171, a user may get a scheduling confirmation for the data file pickup. In other embodiments, the scheduling confirmation is e-mailed to the user.

Screens (not shown) are also provided for checking on the status of a scheduled data file pickup, and for modifying a scheduled data file pickup.

The screen-based interface described herein allows a user to manage pick up and delivery of their files without concern for managing the communication facilities that actually transmit and receive the data files. Accordingly, the user's network management burden is reduced.

The present technique has been described with reference to a screen-based interface. In a modification, the user device may be based on audible presentation of information instead of visual, such as a telephone or terminal providing voice synthesis.

The system of FIG. 1 is useful for multicasting, distributed hosting and network caching.

Multicasting is a session layer protocol built on top of User Datagram Protocol (UDP). It uses Class D address space, from 224.0.0.0 through 239.255.255.255, to send data from one host to multiple hosts. A receive host sends an IGMP join message to routers, or equivalent devices, so that the routers will forward the traffic to the receiving host. Multicast software for delivering content reliably in a satellite environment includes OMNICAST (™) available from StarBurst Communications in Concord, Mass., and FAZZT (™), available from KenCast Software in Stamford, Conn. Additional information on these products is available at www.starburstcom.com and www.kencast.com. OMNICAST uses a StarBurst proprietary Multicast File Transfer Protocol (MFTP) to deliver files to multiple locations.

Distributed hosting refers to storing content from a web site at multiple sites so that the content is closer to a requesting end user, and thus can be delivered faster. The system receivers of FIG. 1 are appropriate for supporting distributed hosting.

Network caching refers to a configuration wherein data is stored in caches at various locations, and provided directly from these locations, thereby eliminating the need to go back to a central source. Network caching conserves network bandwidth and reduces the processing load on the central host. More recent Internet applications are employing cache processing, wherein the cache performs functions based on the content stored therein, such as "playing" streaming video from the cache, providing billing information for pay per view content, modifying file identifiers for ad insertion, and sending run-time commands to a user for streaming software. The system receivers of FIG. 1 are appropriate for supporting distributed hosting.

The system of FIG. 1 allows a user to create new files, update existing files or delete files at a master site, and have these changes automatically reflected at updates to a set of child sites. Controllers 40 and 45 cooperate to provide version control and backup at all sites, automatic restoration of damaged files, priority updating, tailoring data at remote sites, support of multiple operating systems and hardware configurations and remote verification.

Although the present technique has been described with regard to data files, one of ordinary skill in the art will appreciate that the system configuration may also be used for streaming video with suitable modifications to the software described above.

Streaming video refers to separating a video signal into packets which are then sent over the Internet, for example, and reassembled and displayed at the destination in real time. Protocols relevant to streaming video include the Internet Engineering Task Force (IETF) Real Time Transfer Protocol (RTP) (available as Request for Comments (RFC) 1889), Real Time Control Protocol (RTCP) (available as RFC 1890) and Real Time Streaming Protocol (RTSP) (available as RFC 2326). All RFCs are available at www.ietf.org.

Although an illustrative embodiment of the present invention, and various modifications thereof, have been described in detail herein with reference to the accompanying drawings, it is to be understood that the invention is not limited to this precise embodiment and the described modifications, and that various changes and further modifications may be effected therein by one skilled in the art without departing from the scope or spirit of the invention as defined in the appended claims.

What is claimed is:

1. A method for file transfer, comprising:

transmitting a file using a satellite communications link in accordance with a scheduling order created by a sender specifying pickup and delivery instructions for the file and further comprising sending a delivery notice to a destination for the file before transmitting the file.

2. A system for file transfer, comprising:

a transmitter for transmitting a file using a satellite communications link in accordance with a scheduling order created by a sender specifying pickup and delivery instructions for the file and further comprising means for sending a delivery notice to a destination for the file before transmitting the file.

3. A method for file transfer, comprising:

transmitting a file using a satellite communications link in accordance with a scheduling order created by a sender using a screen-based interface specifying pickup and delivery instructions for the file and further comprising sending a delivery notice to a destination for the file before transmitting the file.

4. A system for file transfer, comprising:

a transmitter for transmitting a file using a satellite communications link in accordance with a scheduling order created by a sender using a screen-based interface specifying pickup and delivery instructions for the file and further comprising means for sending a delivery notice to a destination for the file before transmitting the file.

5. A method for file transfer, comprising:

transmitting a file using a satellite communications link in accordance with a scheduling order created by a sender using specifying pickup and delivery instructions for the file and where a delivery notice is sent to a destination for the file at approximately the time that the scheduling order is received.

6. A system for file transfer, comprising:

a transmitter for transmitting a file using a satellite communications link in accordance with a scheduling order created by a sender specifying pickup and delivery instructions for the file where a delivery notice is sent to a destination for the file at approximately the time that the scheduling order is received.

7. A method for file transfer, comprising:

transmitting a file using a satellite communications link in accordance with a scheduling order created by a sender using a screen-based interface specifying pickup and delivery instructions for the file and where a delivery notice is sent to a destination for the file at approximately the time that the scheduling order is received.

8. A system for file transfer, comprising:

a transmitter for transmitting a file using a satellite communications link in accordance with a scheduling order created by a sender using a screen-based interface specifying pickup and delivery instructions for the file where a delivery notice is sent to a destination for the file at approximately the time that the scheduling order is received.

* * * * *

UNITED STATES PATENT AND TRADEMARK OFFICE
CERTIFICATE OF CORRECTION

PATENT NO. : 6,674,994 B1
DATED : January 6, 2004
INVENTOR(S) : Fell et al.

It is certified that error appears in the above-identified patent and that said Letters Patent is hereby corrected as shown below:

Column 10,
Lines 22-23, reads "created by a sender using specifying pickup..." should read
-- created by a sender specifying pickup... --

Signed and Sealed this

Twentieth Day of April, 2004

JON W. DUDAS
*Acting Director of the United States Patent and Trademark Office*